United States Patent [19]
Parsons

[11] Patent Number: 6,094,783
[45] Date of Patent: Aug. 1, 2000

[54] ROPE CLAMP

[75] Inventor: Llewellyn Bertram Parsons, Barrie, Canada

[73] Assignee: 1217145 Ontario Inc., Barrie, Canada

[21] Appl. No.: 09/327,964

[22] Filed: Jun. 8, 1999

[30] Foreign Application Priority Data

Jun. 11, 1998 [CA] Canada ................................. 2240367

[51] Int. Cl.[7] .............................. F16G 11/00; B63B 21/00
[52] U.S. Cl. ............................ 24/130; 24/115 K; 24/127; 24/129 R; 114/218
[58] Field of Search ................................. 24/130, 129 R, 24/129 D, 127, 136 R, 136 K, 115 M, 115 K, 132

[56] References Cited

U.S. PATENT DOCUMENTS

| | | | |
|---|---|---|---|
| 2,296,082 | 9/1942 | Bierk | 24/130 |
| 3,574,900 | 4/1971 | Emery | 24/130 |
| 4,361,938 | 12/1982 | Emery | 24/130 |
| 5,339,498 | 8/1994 | Parsons | 24/130 |
| 5,522,120 | 6/1996 | Brinning | 24/130 |
| 5,596,791 | 1/1997 | Parsons | 24/130 |
| 5,806,452 | 9/1942 | Benoit | 114/218 |

FOREIGN PATENT DOCUMENTS 2224363 12/1997 Canada ................................. 24/130

*Primary Examiner*—Victor N. Sakran
*Attorney, Agent, or Firm*—Ridout & Maybee

[57] ABSTRACT

A multipurpose rope clamp may be attached to a support or suspended from a rail as desired. The clamp provides clamping channel in an open channel between a back plate and a front tongue. Rope is prevented from slipping out of the mouth of the channel by rope guides defining open rope guide channels which open in a direction opposed to the rope gripping channel to form a partial cover for the rope gripping channel. The guides may be lugs spaced to either side of the front tongue so that a bight of rope may be manipulated behind the lugs into the rope gripping channel. Preferably another rope guide channel is provided to form a bight of rope in the clamp into a U-shape.

7 Claims, 3 Drawing Sheets

ROPE CLAMP

BACKGROUND OF THE INVENTION

1. Field of the Invention

This invention relates to a multipurpose rope clamp which may be fixed firmly to a support such as a boat hull or a truck box, the rope clamp acting to clamp the rope firmly in one position while allowing easy adjustment of the rope to tighten it or loosen it, or unfixed (i.e. not attached to a support) to suspend an article from a rail.

2. Acknowledgement of Prior Art

Such a rope clamp may be used where frequent adjustments of the rope are required, for example for suspension of a boat fender. Boat fenders are often suspended from a horizontal rail of a boat to dangle against the side of the boat so as to protect the side of the boat from damage when approaching a dock or other structure. The length of rope between the horizontal rail of the boat and the fender is dependent upon the level of the dock or other structure and may need adjustment for structures at different levels. Moreover, the setting of such fenders must frequently be readjusted since they are frequently untied and brought inboard when not required for use.

Another example of a situation where easy adjustment of the rope in the clamp is required with firm clamping of the rope between adjustments, is for progressive tightening of a tyer by means of a tie-down. Tie-downs frequently operate by means of frictional clamping of webbing positioned in a tortuous path so that, in one position, friction of the webbing against itself prevents loosening of the tyer and, in another position, the tyer may be tightened.

Various devices are available for winding webbing in a tortuous path for use as tie-downs but all of those known to the applicants require careful slotting of the webbing through a buckle in a preset path. Some devices are available as adjustable clamps for ropes. Exemplary of adjustable rope clamps are those described in U.S. Pat. No. 5,339,498 issued to Llewellyn Parsons on Aug. 23, 1994 and U.S. Pat. No. 5,596,791 issued to Llewellyn Parsons on Jan. 28, 1997. Of these, U.S. Pat. No. 5,339,498 describes a rope clamp in which the rope is looped around an object and is allowed to pull freely through the clamp in one direction but is held against movement in the other direction. The rope clamp of U.S. Pat. No. 5,596,791 is a rail fender hanger which hangs loosely on a horizontal rail to adjustably clamp a rope therein. More recently, Canadian Patent Application No. 2,224,363 describes a rope clamp which may be used as a tie down.

SUMMARY OF THE INVENTION

According to the present invention there is provided a rope clamp comprising a back carrier plate for attachment to an article and an integral parallel front tongue defining a rope channel therebetween, inner faces of the front tongue and the back plate being provided with converging clamping ribs to narrow the rope channel towards a base thereof, the back plate having an extension plate extending beyond said base, the extension plate having rope guides to define a rope entry path on side of the base and front tongue and a rope exit path to the other side of the base and front tongue, to guide the rope between the clamping ribs, the guides being spaced from each other to allow manual disengagement therefrom or engagement thereinto of a bight of rope.

Attachment means are provided on the back plate to attach the clamp to a surface of a support such as a boat hull or deck or to the box of a trailer or, indeed to any support. Attachment means for a rail may be screws or bolts passing through apertures in the back carrier plate or extension plate.

If the clamp is to be used to hang an article from a rail, it is not necessary to utilize the attachment means at attach the back plate to the support. It may hang freely from the rail suspended by a bight of rope passing over the rail. The clamp may hang on the rope itself due to its own clamping action. Even in this instance a support may be used if desired. In use the rope clamp should be located above or below the rail over which the rope is to pass before entry into the rope entry path. The rail may be of any convenient section, e.g. square or round. Preferably the clamp includes a further guide for rope upstream of the rail. This further guide may be a tubular channel through which rope passes freely, the channel running parallel to said base.

Preferably the rope guides confine a bight of rope into a U with the web of the U lying in the base of the rope channel where the clamping ribs come together and the legs of the U diverging from the web.

Each guide may be a lug projecting towards the base and having its root on a line parallel, or approximately parallel, to the base, the lug upstanding from the back extension plate and bent over to confine the rope. The distal end of each lug is free so that the bight of rope may be tucked behind it.

BRIEF DESCRIPTION OF THE DRAWINGS

Embodiments of the invention will now be described by way of example with reference to the drawings in which.

DETAILED DESCRIPTION OF A PREFERRED EMBODIMENT

Figure 1:
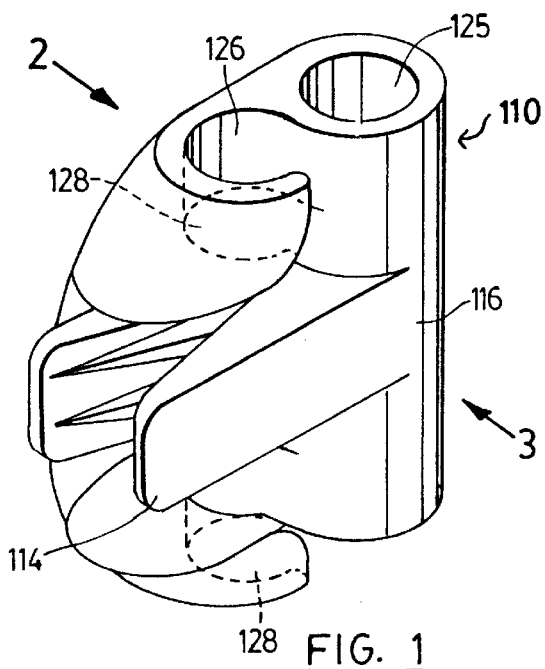
FIG. 1 shows a perspective view of a rope clamp according to the invention with rope arranged therein.
Figure 2:
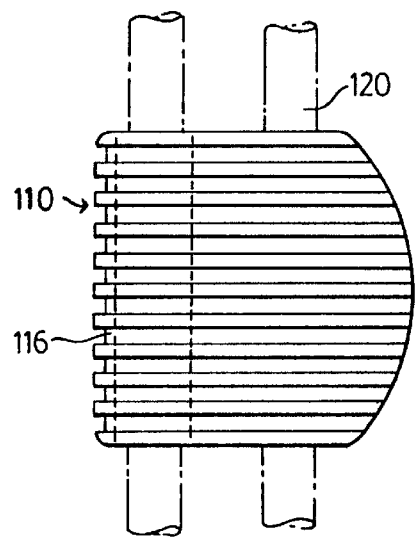
FIG. 2 is a rear view of the rope clamp of FIG. 1.

The drawings show a rope clamp 110 comprising a back plate 112 integrally molded with a front tongue 114 through an integral portion 116. The front tongue 114 is spaced from the back plate 112 by a distance corresponding roughly to the diameter of a rope to be clamped in the clamp. Front tongue 114 is generally parallel to back plate 112 at least in so far as their outer surfaces are concerned. The inner surfaces of front tongue 114 and back plate 112 are provided with converging clamping ribs 118 which come together at integral portion 116 in a V shape to form a rope gripping channel. A rope 120 fits easily and loosely into the upper open part of the V and may be clamped firmly by the lower part of the V by the clamping ribs 118. Thus a rope gripping channel 122 is formed between the front tongue 114 and the back plate 112 narrowed towards its base 124 by the converging ribs 118. The base 124 lies along an edge of integral portion 116.

The back plate 112 has extends beyond tongue 114 on either side through portions 126.

Integral portion 116 extends away from base 124 of rope channel 122 and away from back plate extension 113. Integral portion 116 has a further tubular rope channel 125 through it running generally parallel with base 124. Channel 125 guides rope to form it into a U-shape with tope in gripping channel 122. Thus a bight of rope arranged in the rope clamp 110 has one run in gripping channel 122 forming one leg of a U, and another run in tubular channel 125 forming another leg of the U and a further run of the rope forming the web of the U. The web of the U may pass over a hanging rail (see FIG. 5 and 7) or pass directly between channels 122 and 125 (see FIG. 6).

Guide lugs 128 are upstanding from back plate 112 at roots on a vertical line parallel with and forward from base 124. The guide lugs 128 bend over into a L shape to confine the rope between each lug and the portion 126. The guide lugs 128 form open rope entry and exit channels parallel with an opposed to rope gripping channel 122 and are spaced from front tongue 114 by a distance sufficient to allow entry of a bight of rope therebetween for engagement or disengagement of rope into clamp 110. The spacing distance may approximately be the diameter of rope which is to be used.

The actual three dimensional shape of rope clamp 110 may possibly be best seen from the perspective view of FIG. 1.

Figure 5:
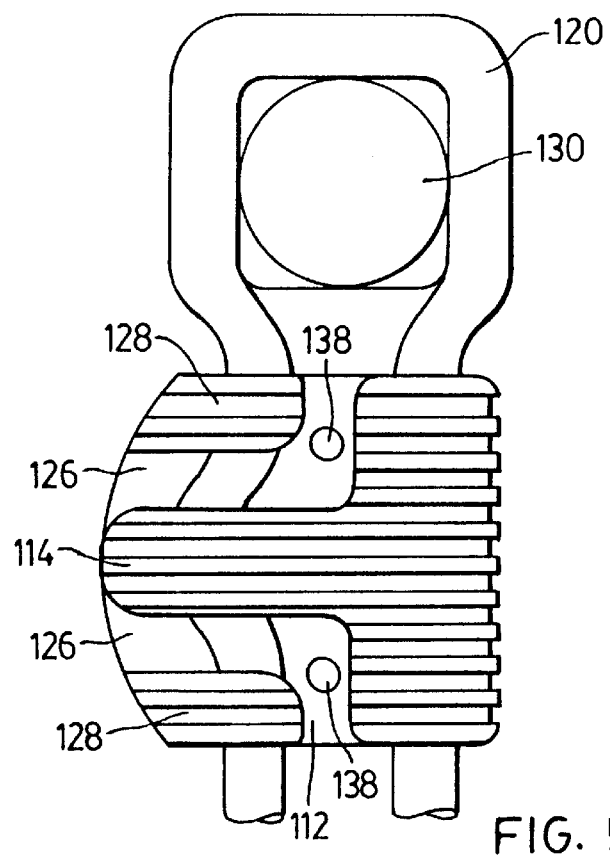
FIG. 5 illustrates a rope clamp according to the invention used to hang on a rail.
Figure 6:
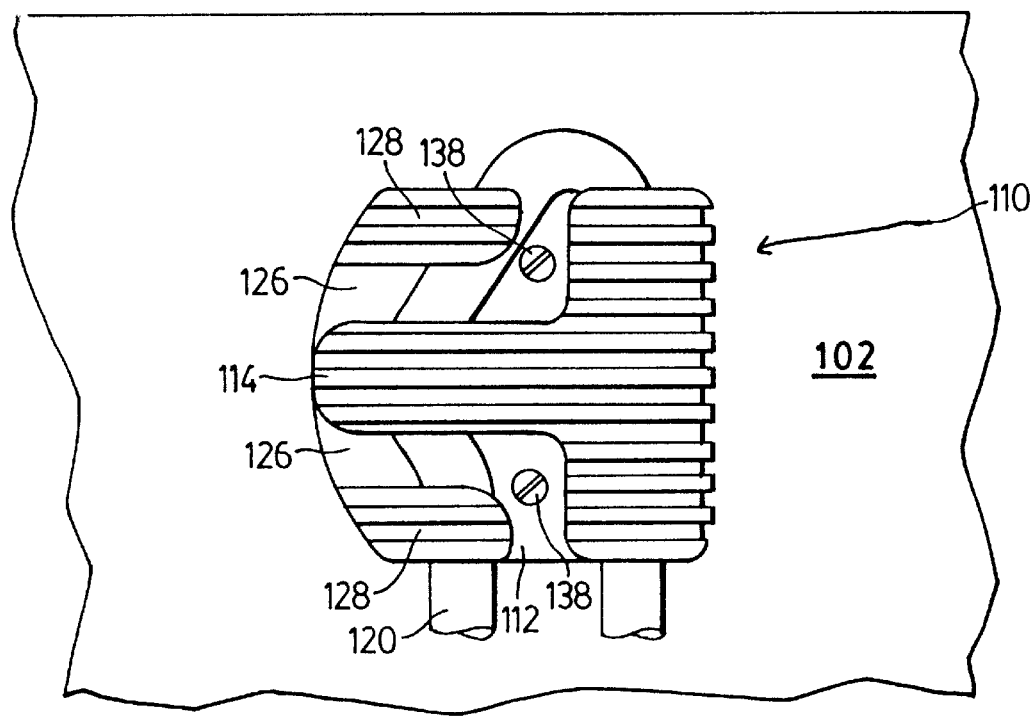
FIG. 6 illustrates a rope clamp according to the invention in which no rail is involved.

FIG. 6 shows the rope clamp 110 attached to an article 102 with its base vertical and with further rope channel 125 also vertical. Attachment is by screws 138 Rope 120 is shown confined behind both L-shaped guide lugs 128 forming a U with the back plate 112. The rope is also confined in rope gripping channel 122 clamped by converging clamping ribs 118. FIG. 5 shows a similar case where rail 130 is present. In the situation shown in FIG. 5 the clamp 110 may be attached to a support or not at the user's convenience.

Figures 7, 8:
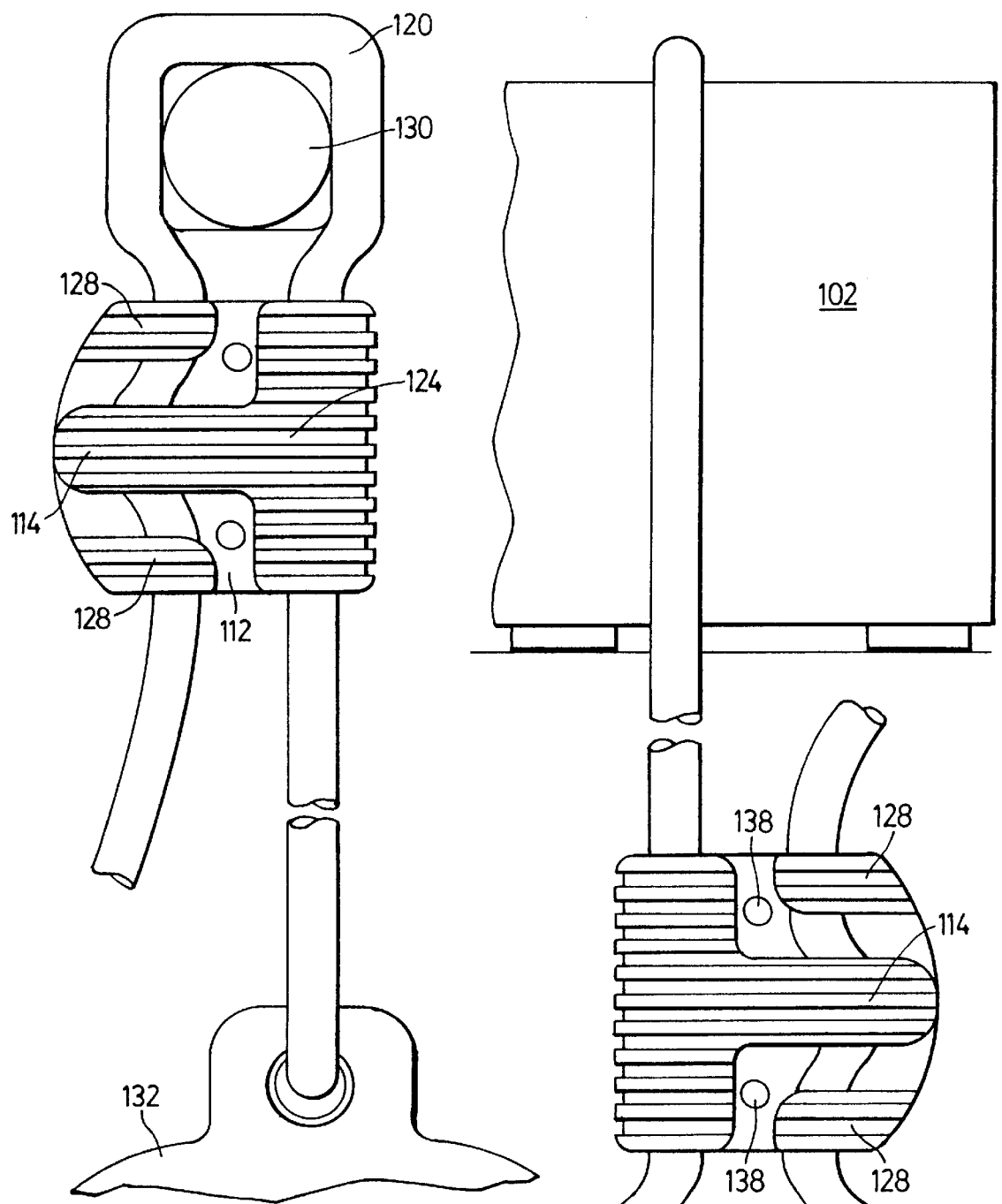
FIG. 7 illustrates a rope clamp according to the invention being used as a fender hanger.
FIG. 8 illustrates the rope clamp of FIG. 1 being used as a tie-down.

In FIG. 7, which shows the clamp 110 being used to hang a fender 132 from a rail 130. Rope 120 from, say a fender, rises to pass through guide channel 125 and thence around rail 130 and finally passes downwardly though clamping channel 122.

FIG. 8 shows a similar rope clamp 110 to that of FIG. 6 but it is being used as a tie-down for a box 102 of a trailer or truck. As illustrated the clamp 110 is attached to the trailer or truck box 102 by means of bolts or screws 138.

Figure 3:
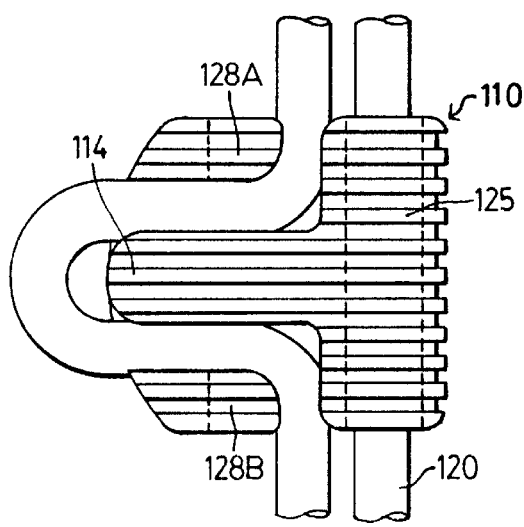
FIG. 3 shows a front view of the clamp of FIG. 1 showing rope being inserted thereinto.
Figure 4:
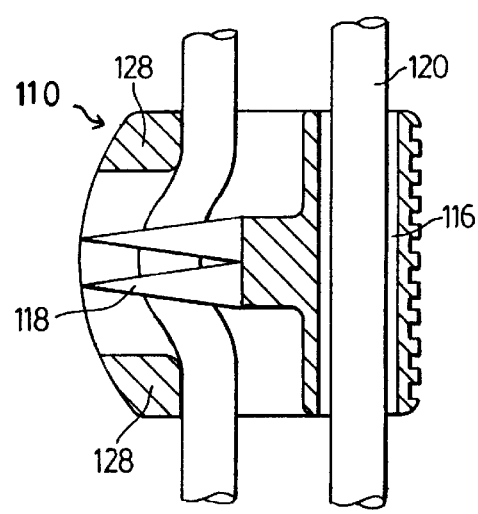
FIG. 4 is a vertical transverse section through the clamp of FIG. 1 indicating rope therein.

The manner of inserting the rope into clamped position will now be described. An end of rope 120 is first threaded through further rope guide channel 125 and, for example, passed over rail 130 as seen in FIG. 5. A bight of entry rope 120 may then be inserted between the top guide lug 128A and the extension plate 126 either freely or by biassing the guide lugs slightly. It is then pulled or allowed to slip back through channel 125 to adjust the finally desired position of rope 20. When this is achieved, the end of rope 120 is inserted behind lower lug 128B with a bight of rope 104 lodged ready to enter clamping channel 122 (see FIG. 3). The rope may now be clamped firmly by pulling on the end of the rope. In this position the rope 120 is held firmly by the clamping ribs 118.

I claim:

1. A rope clamp optionally attachable to a support comprising a molded unit comprising a back carrier plate having an integral parallel front tongue spaced therefrom defining a substantially straight open rope gripping channel therebetween; an inner face of the front tongue and an inner face of the back plate being provided with converging clamping ribs to narrow said open rope gripping channel towards a channel base thereof; the back carrier plate extending to either side of the front tongue and having a rope guide to each side of the front tongue, one of the rope guides defining an open rope entry channel opposed to said open rope gripping channel and the other of the rope guides defining a rope exit channel opposed to said open rope gripping channel to guide the rope between the clamping ribs, each of the rope guides being spaced from the front tongue by a distance sufficient to pass a bight of rope between said tongue and the respective rope guide for engagement or disengagement in said open rope gripping channel.

2. A rope clamp as claimed in claim 1 which includes a straight tubular rope guide parallel to said rope gripping channel and said entry and exit channels, whereby a bight of rope in said rope clamp is formed into a U-shape, one run of rope confined in the rope gripping channel forming one leg of the U, another run of rope in the tubular rope guide forming another leg of the U and a loop of rope between said runs forming a web of the U.

3. A rope clamp as claimed in claim 2 in which each of said one and said other rope guides comprises a lug having a free distal end, the lug upstanding from one of said back plate extensions to project towards said channel base and having a root substantially parallel to said channel base.

4. A rope clamp as claimed in claim 3 in which each of said one and said other rope guides comprises an L-shaped lug of which one limb of the L constitutes a roof portion parallel to said channel base and upstanding from the back plate, and the other limb of the L projects towards said channel base substantially flush with said front tongue.

5. A rope clamp as claimed in claim 2 in which said channel base of said gripping channel and said tubular rope guide are adjacent each other and are molded integrally.

6. A rope clamp as claimed in claim 1 in which the front tongue is spaced from the back plate by a distance substantially corresponding to the diameter of rope for which it is to be used.

7. A rope clamp as claimed in claim 1 in which the back plate includes attachment means for attaching it to said support.

* * * * *